(12) United States Patent
Rajakumar

(10) Patent No.: US 10,855,679 B2
(45) Date of Patent: *Dec. 1, 2020

(54) AUTOMATED SCALABLE IDENTITY-PROOFING AND AUTHENTICATION PROCESS

(71) Applicant: Vercrio, Inc., Wilmington, DE (US)

(72) Inventor: Anthony Rajakumar, Fremont, CA (US)

(73) Assignee: Vercrio, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,965

(22) Filed: Nov. 8, 2018

(65) Prior Publication Data

US 2019/0075105 A1    Mar. 7, 2019

Related U.S. Application Data

(63) Continuation of application No. 15/587,870, filed on May 5, 2017, now Pat. No. 10,148,649.
(Continued)

(51) Int. Cl.
*H04L 29/06* (2006.01)
*G06K 9/00* (2006.01)
(Continued)

(52) U.S. Cl.
CPC ...... *H04L 63/0861* (2013.01); *G06K 9/00899* (2013.01); *H04N 21/4415* (2013.01);
(Continued)

(58) Field of Classification Search
CPC ............ H04L 63/0861; H04L 61/6022; G06K 9/00899; H04N 21/4627; H04N 21/4415
See application file for complete search history.

(56) References Cited

U.S. PATENT DOCUMENTS 6,636,973 B1 * 10/2003 Novoa ..................... G06F 21/32
340/5.74
6,644,557 B1 * 11/2003 Jacobs ..................... F24F 11/30
236/46 R
(Continued)

FOREIGN PATENT DOCUMENTS

WO    WO2016/033698 A1    3/2016

OTHER PUBLICATIONS

Brainard et al., Fourth-Factor Authentication: Somebody You Know, ACM, 2006.*
(Continued)

*Primary Examiner* — David Garcia Cervetti
(74) *Attorney, Agent, or Firm* — Paradice and Li LLP

(57) ABSTRACT

An automated process is disclosed for improving the functionality of computer systems and electronic commerce in user identity-proofing. Steps include verifying that a user who is electronically seeking identity proofing is on an electronic directory of persons eligible for such identity proofing; creating an attest list for the user that includes associates who can vouch for his or her identity; collecting a video or other data from the user; sending the video or data to the associates and asking them for a confirmation or a disavowal of the identity of the user; deriving a biometric from the video or data upon receiving the confirmation; and saving the biometric as an identity-proofed biometric.

19 Claims, 7 Drawing Sheets

Related U.S. Application Data

(60) Provisional application No. 62/338,114, filed on May 18, 2016.

(51) Int. Cl.
*H04N 21/4415* (2011.01)
*H04N 21/4627* (2011.01)
*H04L 29/12* (2006.01)
*H04N 21/414* (2011.01)

(52) U.S. Cl.
CPC ..... *H04N 21/4627* (2013.01); *H04L 61/1523* (2013.01); *H04L 61/6022* (2013.01); *H04N 21/41407* (2013.01)

(56) References Cited

U.S. PATENT DOCUMENTS

| | | | |
|---|---|---|---|
| 6,657,538 B1* | 12/2003 | Ritter | G07C 9/37 340/5.81 |
| 6,980,669 B1* | 12/2005 | Uchida | G06K 9/00013 382/115 |
| 7,174,319 B2 | 2/2007 | Johnson | |
| 7,881,957 B1* | 2/2011 | Cohen | G06Q 10/06 |
| 8,005,697 B1* | 8/2011 | Cohen | G06Q 10/06311 705/7.13 |
| 8,024,211 B1* | 9/2011 | Cohen | G06Q 10/06311 705/7.14 |
| 8,170,897 B1* | 5/2012 | Cohen | G06Q 30/08 705/7.13 |
| 8,250,632 B1* | 8/2012 | Staddon | H04L 63/08 726/4 |
| 8,429,757 B1 | 4/2013 | Cavage et al. | |
| 8,438,617 B2* | 5/2013 | Brainard | G06F 21/31 726/5 |
| 8,646,039 B2* | 2/2014 | Bentley | H04L 63/08 726/3 |
| 8,782,264 B2 | 7/2014 | Harrison | |
| 8,832,788 B1* | 9/2014 | Gibson | G06F 21/40 726/2 |
| 8,856,879 B2* | 10/2014 | Schechter | G06F 21/41 726/4 |
| 8,869,241 B2* | 10/2014 | Davis | G06F 21/316 726/3 |
| 8,950,001 B2* | 2/2015 | Bentley | G06F 21/31 726/28 |
| 9,038,146 B1* | 5/2015 | Desikan | H04L 63/0884 726/4 |
| 9,100,171 B1* | 8/2015 | Peterson | H04L 9/3268 |
| 9,203,826 B1* | 12/2015 | Margolis | H04L 63/08 |
| 9,544,309 B1 | 1/2017 | Robinson et al. | |
| 9,584,530 B1* | 2/2017 | Statica | H04L 63/062 |
| 9,602,768 B2* | 3/2017 | Akimoto | H04N 7/15 |
| 9,721,080 B2* | 8/2017 | Moran | G06K 9/00973 |
| 9,852,426 B2* | 12/2017 | Bacastow | G06Q 20/425 |
| 9,866,394 B2* | 1/2018 | Alkhalaf | H04L 9/3231 |
| 9,922,475 B2* | 3/2018 | Patterson | G06F 21/31 |
| 10,193,616 B1* | 1/2019 | Parr | H04B 7/18513 |
| 10,275,590 B2* | 4/2019 | Chakraborty | G06F 21/40 |
| 2001/0034836 A1 | 10/2001 | Matsumoto et al. | |
| 2001/0044900 A1* | 11/2001 | Uchida | G06Q 20/40 713/186 |
| 2002/0169855 A1* | 11/2002 | Maehiro | H04L 51/00 709/219 |
| 2003/0115267 A1* | 6/2003 | Hinton | H04L 63/0815 709/204 |
| 2003/0204751 A1* | 10/2003 | Jindani | H04L 63/102 726/28 |
| 2004/0041690 A1* | 3/2004 | Yamagishi | G07C 9/37 340/5.52 |
| 2004/0054885 A1* | 3/2004 | Bartram | H04L 67/104 713/152 |
| 2004/0131187 A1* | 7/2004 | Takao | H04L 63/104 380/255 |
| 2005/0054926 A1* | 3/2005 | Lincoln | G06K 9/0002 600/443 |
| 2006/0000894 A1* | 1/2006 | Bonalle | G06K 19/0718 235/380 |
| 2006/0106675 A1* | 5/2006 | Cohen | G06Q 30/0601 705/26.1 |
| 2007/0050632 A1* | 3/2007 | Matsuoka | G06F 21/31 713/182 |
| 2007/0092112 A1* | 4/2007 | Awatsu | G06Q 20/3227 382/115 |
| 2007/0192858 A1* | 8/2007 | Lum | H04L 29/12028 726/22 |
| 2007/0282887 A1* | 12/2007 | Fischer | G06F 16/9535 |
| 2008/0120421 A1* | 5/2008 | Gupta | G06Q 10/10 709/229 |
| 2008/0120692 A1* | 5/2008 | Gupta | H04L 65/1096 726/1 |
| 2008/0130962 A1* | 6/2008 | Lee | G06K 9/00288 382/118 |
| 2008/0279425 A1* | 11/2008 | Tang | G06K 9/00221 382/118 |
| 2008/0289020 A1* | 11/2008 | Cameron | H04L 9/3213 726/9 |
| 2008/0320572 A1* | 12/2008 | Connell, II | G06Q 30/00 726/6 |
| 2009/0138405 A1* | 5/2009 | Blessing | H04L 63/1466 705/67 |
| 2009/0192968 A1* | 7/2009 | Tunstall-Pedoe | G06N 5/022 706/47 |
| 2009/0232367 A1* | 9/2009 | Shinzaki | G06K 9/0012 382/124 |
| 2009/0278492 A1* | 11/2009 | Shimizu | H02J 50/10 320/108 |
| 2010/0023371 A1* | 1/2010 | Hartz | G06Q 30/0601 705/310 |
| 2010/0115114 A1* | 5/2010 | Headley | G10L 17/22 709/229 |
| 2010/0266169 A1* | 10/2010 | Abiko | G06K 9/00026 382/124 |
| 2010/0332392 A1* | 12/2010 | Ueno | G06Q 20/40145 705/44 |
| 2011/0200237 A1* | 8/2011 | Nakamura | A61B 5/1171 382/127 |
| 2011/0307403 A1* | 12/2011 | Rostampour | G06Q 50/265 705/325 |
| 2012/0192250 A1* | 7/2012 | Rakan | H04L 63/08 726/2 |
| 2013/0028488 A1* | 1/2013 | Abe | G06K 9/0008 382/115 |
| 2013/0067545 A1* | 3/2013 | Hanes | H04L 63/061 726/6 |
| 2013/0177219 A1* | 7/2013 | Frojdh | G06K 9/00926 382/118 |
| 2013/0263238 A1* | 10/2013 | Bidare | H04L 9/3231 726/7 |
| 2013/0290707 A1* | 10/2013 | Sinclair | H04L 9/3226 713/161 |
| 2013/0339525 A1* | 12/2013 | Tamari | G06F 3/011 709/225 |
| 2014/0020090 A1* | 1/2014 | Nada | G06F 21/32 726/19 |
| 2014/0033284 A1* | 1/2014 | Harik | H04L 29/06 726/5 |
| 2014/0096210 A1* | 4/2014 | Dabbiere | G06F 21/316 726/5 |
| 2014/0208394 A1* | 7/2014 | Goodwin | H04L 63/08 726/4 |
| 2014/0331282 A1* | 11/2014 | Tkachev | G06F 21/31 726/3 |
| 2014/0333415 A1* | 11/2014 | Kursun | G06Q 30/00 340/5.83 |
| 2015/0058016 A1* | 2/2015 | Goldstein | G06F 21/32 704/246 |
| 2015/0058931 A1* | 2/2015 | Miu | G06Q 20/4016 726/3 |

(56) References Cited

U.S. PATENT DOCUMENTS

| | | | |
|---|---|---|---|
| 2015/0081299 A1* | 3/2015 | Jasinschi | G10L 25/66 704/246 |
| 2015/0081870 A1* | 3/2015 | Hamada | H04L 12/1818 709/223 |
| 2015/0095999 A1* | 4/2015 | Toth | H04L 63/061 726/6 |
| 2015/0106148 A1* | 4/2015 | Thomas | G06Q 50/01 705/7.19 |
| 2015/0128240 A1* | 5/2015 | Richards | H04W 12/0608 726/7 |
| 2015/0128242 A1* | 5/2015 | Hoy | H04L 63/08 726/9 |
| 2015/0135292 A1* | 5/2015 | Lee | H04L 63/08 726/7 |
| 2015/0229514 A1* | 8/2015 | Okuyama | H04L 67/303 709/214 |
| 2015/0244718 A1* | 8/2015 | Smets | G06F 21/74 726/7 |
| 2015/0281204 A1* | 10/2015 | Ellis | H04L 45/64 726/9 |
| 2015/0363803 A1* | 12/2015 | Thomas | G06Q 30/0204 705/7.33 |
| 2015/0381624 A1* | 12/2015 | Reiter | G06F 21/88 713/168 |
| 2016/0012427 A1* | 1/2016 | Van Heerden | H04L 63/08 705/44 |
| 2016/0055327 A1* | 2/2016 | Moran | G06K 9/00899 726/19 |
| 2016/0080347 A1* | 3/2016 | Rappaport | G06F 21/6263 726/5 |
| 2016/0140341 A1* | 5/2016 | Kramer | G06F 21/577 726/25 |
| 2016/0162729 A1* | 6/2016 | Hagen | G06T 11/60 382/118 |
| 2016/0231887 A1* | 8/2016 | Hatano | H04N 1/00344 |
| 2016/0277439 A1* | 9/2016 | Rotter | H04W 12/06 |
| 2016/0308859 A1* | 10/2016 | Barry | G06K 9/2036 |
| 2017/0019400 A1* | 1/2017 | Drolshagen | H04W 12/06 |
| 2017/0032485 A1* | 2/2017 | Vemury | G06Q 50/265 |
| 2017/0078880 A1* | 3/2017 | Likar | H04L 63/08 |
| 2017/0104957 A1* | 4/2017 | Farrell | G10L 17/02 |
| 2017/0115726 A1* | 4/2017 | Fung | G06F 3/005 |
| 2017/0135577 A1* | 5/2017 | Komogortsev | A61B 3/14 |
| 2017/0147870 A1* | 5/2017 | Shakib | G06F 16/51 |
| 2017/0180361 A1* | 6/2017 | Sampas | G06K 9/00013 |
| 2017/0201518 A1* | 7/2017 | Holmqvist | H04L 63/10 |
| 2017/0264608 A1* | 9/2017 | Moore | H04W 12/06 |
| 2018/0068334 A1* | 3/2018 | Alomar | G06Q 30/0209 |
| 2018/0122031 A1* | 5/2018 | Chabanne | H04L 9/0869 |
| 2018/0173871 A1* | 6/2018 | Toth | H04L 9/3263 |

OTHER PUBLICATIONS

International Search Report and Written Opinion dated Jul. 31, 2017 in PCT Application No. Pct/US17/31576, filed May 8, 2017.

* cited by examiner

A process involving identity proofing, the process performed electronically, automated on a computer system and scalable as to number of persons participating
100

Verifying step: verifying that a potential candidate electronically seeking identity proofing is on an electronic directory of persons eligible for such identity proofing
105

Creating step: creating an attest list, the attest list comprising for each potential candidate, one or more associates of the potential candidate that can confirm the identity of the potential candidate when viewing a video of the potential candidate
110

Collecting step: collecting a video from the potential candidate making an electronic request for identity proofing
115

Presenting step: presenting the video to the one or more associates on the attest list
120

Asking step: asking the one or more associates for a confirmation or a disavowal of the identity of the potential candidate based on reviewing the video
125

Deriving step: deriving a biometric from the video upon receiving the confirmation from any of the one or more associates
130

Saving step: saving the biometric as an identify-proofed biometric
135

FIG.1

```
┌─────────────────────────────────────────────────────────────┐
│ A process involving identity proofing, the process performed electronically, │
│ automated on a computer system and scalable as to number of persons │
│ participating                                                │
│                                                         100  │
└─────────────────────────────────────────────────────────────┘
┌─────────────────────────────────────────────────────────────┐
│ Designating step: designating a number of associates of the potential │
│ candidate that are needed to confirm the identity of the potential candidate │
│                                                         205  │
└─────────────────────────────────────────────────────────────┘
┌─────────────────────────────────────────────────────────────┐
│ Scoring step: scoring a confidence level in the confirmation of identity, wherein │
│ the confidence level is a percentage of associates meeting the designation │
│                                                              │
│                                                         210  │
└─────────────────────────────────────────────────────────────┘
┌─────────────────────────────────────────────────────────────┐
│ Second saving step: saving the confidence level with the identify-proofed │
│ biometric                                               215  │
└─────────────────────────────────────────────────────────────┘
```

FIG.2

```
┌─────────────────────────────────────────────────────────────┐
│ A process involving identity proofing, the process performed electronically, │
│ automated on a computer system and scalable as to number of persons │
│ participating                                                │
│                                                         100  │
└─────────────────────────────────────────────────────────────┘
┌─────────────────────────────────────────────────────────────┐
│ Second creating step: creating a list of the one or more associates who │
│ confirmed or disavowed the potential candidate          305  │
└─────────────────────────────────────────────────────────────┘
┌─────────────────────────────────────────────────────────────┐
│ Associating step: associating the list with the identity-proofed biometric │
│                                                              │
│                                                         310  │
└─────────────────────────────────────────────────────────────┘
┌─────────────────────────────────────────────────────────────┐
│ Third saving step: saving the list                           │
│                                                         315  │
└─────────────────────────────────────────────────────────────┘
```

FIG.3

A process involving identity proofing, the process performed electronically, automated on a computer system and scalable as to number of persons participating
100

Second collecting step: collecting an audio component within the video
405

Second deriving step: deriving an audio-biometric from the audio component
410

Fourth saving step: saving the audio-biometric with the identify-proofed biometric
415

FIG.4

A process involving identity proofing, the process performed electronically, automated on a computer system and scalable as to number of persons participating
100

Storing step: storing a first characteristic with the identify-proofed biometric, the first characteristic comprising at least one of: a location where the electronic request originated; a type of computer from which the electronic request originated; a Media Access Control (MAC) address from which the electronic request originated; and an Internet Protocol address from which the electronic request originated
505

FIG.5

A process involving identity proofing, the process performed electronically, automated on a computer system and scalable as to number of persons participating
100

Receiving step: receiving a second video from the potential candidate incident to a subsequent electronic request for authentication from the potential candidate
605

Third deriving step: deriving a second biometric from the second video
610

Setting step: setting a threshold for matching the second biometric with the identify-proofed biometric
615

Denying step: denying authentication of the potential candidate when the second biometric does not meet the threshold
620

Taking-action step: taking an action when matching the second biometric with the identity-proofed biometric meets or exceeds the threshold, the action selected from the group consisting of: limiting access to the computer system by the potential candidate, allowing access to the computer system by the potential candidate, collecting and changing a password associated with the potential candidate, verifying authorship of an electronic document, verifying the authorization of an email from the potential candidate, signing an electronic document by the potential candidate, and issuing a physical identification document that vouches for the identity of the potential candidate
625

FIG.6

A process involving identity proofing, the process performed electronically, automated on a computer system and scalable as to number of persons participating
100

Verifying step: verifying that a potential candidate electronically seeking identity proofing is on an electronic directory of persons eligible for such identity proofing
105

Creating step: creating an attest list, the attest list comprising for each potential candidate, one or more associates of the potential candidate that can confirm the identity of the potential candidate when viewing a video of the potential candidate
110

Collecting step: collecting a video from the potential candidate making an electronic request for identity proofing
115

Presenting step: presenting the video to the one or more associates on the attest list
120

Asking step: asking the one or more associates for a confirmation or a disavowal of the identity of the potential candidate based on reviewing the video
125

Deriving from data step: deriving a biometric from data acquired from the potential candidate
830

Fifth saving step: saving the biometric as an identify-proofed biometric
835

FIG.8

| A process involving identity proofing, the process performed electronically, automated on a computer system and scalable as to number of persons participating 100 |
|---|

| Verifying step: verifying that a potential candidate electronically seeking identity proofing is on an electronic directory of persons eligible for such identity proofing 105 |
|---|

| Creating step: creating an attest list, the attest list comprising for each potential candidate, one or more associates of the potential candidate that can confirm the identity of the potential candidate when viewing a video of the potential candidate 110 |
|---|

| Collecting step: collecting a video from the potential candidate making an electronic request for identity proofing 115 |
|---|

| Presenting step: presenting the video to the one or more associates on the attest list 120 |
|---|

| Asking step: asking the one or more associates for a confirmation or a disavowal of the identity of the potential candidate based on reviewing the video 125 |
|---|

| Second taking-action step: taking an action upon receiving the confirmation, said action selected from the group consisting of: limiting access to the computer system by the potential candidate, allowing access to the computer system by the potential candidate, collecting and changing a password associated with the potential candidate, verifying authorship of an electronic document, verifying the authorization of an email from the potential candidate, signing an electronic document by the potential candidate, and issuing a physical identification document that vouches for the identity of the potential candidate 905 |
|---|

FIG.9

AUTOMATED SCALABLE IDENTITY-PROOFING AND AUTHENTICATION PROCESS

CROSS REFERENCE TO RELATED APPLICATIONS

This application is a continuation of and claims priority to U.S. application Ser. No. 15/587,870, filed May 5, 2017, entitled "Automated Scalable Identity-Proofing And Authentication Process" which claims priority under 35 USC 119 to U.S. Provisional Application No. 62/338,114, filed May 18, 2016, entitled "Biometric System to Automatically Resolve Security Alerts in Computer Networks," both of which are incorporated by reference herein in their entireties.

TECHNICAL FIELD

In the field of information management, a method improving security in the use and usefulness of computer-related technology so as to increase confidence in identity proofing and to improve the efficiency and reliability of electronic authentication of individuals.

BACKGROUND ART

The modern computer network is often an amalgam of disparate computer systems, particularly for business, government and educational organizations. These computer systems are often networked together in what is a virtual nervous system, integrating a diverse array of operational activities.

There may be several points in the normal course of a computer network where identity may need to be determined. Logging in to a system is one such point. Other points include when verifying that a person did in fact send an email, acquiring electronic signatures for documents or approving a security alert. When such an event occurs, the system is invoked to verify identity of a given target user.

The security and integrity of each individual network has become a significant area of concern. Many diverse security systems exist to protect organizations from malicious attacks on the data, computers and networking that comprise each such network. Some are more successful than others.

Companies have responded to these attacks in several ways. One of the most common is to use a second channel of proof that is independent of the computer channel.

The technique with the broadest deployment is Short Message Service One-Time Passwords (SMS OTP). In this case, a mobile phone is used as an independent channel for authentication built upon the capability to receive SMS messages. When a user forgets their password for example, a SMS message is sent to the user's mobile phone containing a temporary password that can be used only once. The user is to log in with the one-time password and then change their password. This method has been broadly deployed since it is fairly cheap to implement, as most people have their own mobile phones and so additional hardware is not necessary.

Another technique is to use a hardware token, e.g. a key fob, which generates a temporary code that can be authenticated at the server end to grant access, such as the RSA SECURID system.

Another technique in the market is the use of biometrics. Biometrics refers to mathematical representations of human aspects such as facial or voice measurements that can be used to uniquely identify an individual within a given confidence threshold. First, the user's biometrics are enrolled into a system, and subsequently when the user returns claiming an identity, the presented biometrics are compared to the stored values and a determination is made on identity.

Another approach is to use mobile phones, associating a phone's unique characteristics with a user. For example, a phone may have a unique network address, and this address can be associated with a user.

SUMMARY OF INVENTION

An automated process is disclosed for improving the functionality of computer systems and electronic commerce in user identity-proofing. Steps include verifying that a user who is electronically seeking identity proofing is on an electronic directory of persons eligible for such identity proofing; creating an attest list for the user that includes associates who can vouch for his or her identity; collecting a video or other data from the user; sending the video or data to the associates and asking them for a confirmation or a disavowal of the identity of the user; deriving a biometric from the video or data upon receiving the confirmation; and saving the biometric as an identity-proofed biometric.

Further optional steps include designating a number of associates that are needed to confirm the identity of the user; scoring a confidence level equaling the percentage of designated associates responding to confirm; creating a list of the associates who confirmed or disavowed the user; storing the location where the electronic request originated; storing the type of computer from which the electronic request originated; storing the Media Access Control (MAC) address from which the electronic request originated; and storing an IP address from which the electronic request originated.

The process may further include steps of receiving a second video from the potential candidate incident to a subsequent electronic request for authentication from the potential candidate; deriving a second biometric from the second video; setting a threshold for matching the second biometric with the identity-proofed biometric; denying authentication of the potential candidate when the second biometric does not meet the threshold, or taking an action that includes limiting access to the computer system by the potential candidate; allowing access to the computer system by the potential candidate; collecting and changing a password associated with the potential candidate, verifying the authorship of an electronic document; verifying the authorization of an email from the potential candidate, signing an electronic document by the potential candidate, and issuing a physical identification document that vouches for the identity of the potential candidate.

The process may be performed using a smartphone to collect the video and to send the video to the associate. While an associate may be listed on the attest list as being able to vouch for the potential candidate, an optional step is to strike anyone on the attest list that has not received an approval of a third party, such as a supervisor, to vouch for the potential candidate.

Technical Problem

A significant problem stems from the use of a username and password combination to authenticate a user's identity. Security from this arrangement is based on the assumption that only the legitimate user will know the username and password combination, and so if the username and password combination is correct, then it is assumed that the user is legitimate and can be provided access.

It is now commonly recognized that this assumption is flawed because of the phenomenon of 'phishing.' Phishing refers to tricking a user to reveal their username and password combination using fake email or websites. Such ruses are now quite common, and relatively easy to do for attackers. Such ruses are also difficult for users, even sophisticated users, to quickly determine if a website is legitimate or not. This is because legitimate websites and systems require users to reset their passwords occasionally (ironically sometimes for security purposes or in response to phishing attempts), and phishers then copy these legitimate requests when creating their phishing sites.

In addition, many users end up using common and predictable passwords that can be guessed or brute-forced. And of course, people forget their passwords often and this leads to user frustration. Thus, the most commonly used method for ensuring computer system security is not very effective, and leads to many incidents of data breaches, some of which even make news because of their implications for business or for national security.

The Short Message Service One-Time Passwords (SMS OTP) method has several flaws. First, the user has to associate their mobile phone with their identity. Many users do not take this additional step as they view it as an inconvenience. Second, associating their identity consists of matching a password before linking a phone number the user provides to their identity. Of course, if an attacker has already compromised the user's password, then the attacker may associate their identity instead of the user. Third, because of the insecurity of identity at large mobile providers, attackers have taken over a user's phone account and acquire a new phone with the number associated with that account, and thus receive the one-time password on that new device. Fourth, the SMS network is itself vulnerable to spoofing attacks, and an attacker may intercept the one-time password within the network without needing access to the phone. Thus, this is a very insecure means of ensuring security, and for these reasons the National Institute of Standards and Technology (NIST) deprecated the use of SMS OTP.

The use of hardware tokens, such as in the RSA SECURID system, has flaws. First, the system is generally cumbersome to use. The user has to remember to have the token with them. The token then generates a long sequence of digits that must be entered, and many users have difficulty with this process. Second, for companies, there are additional hardware costs and maintenance costs to be paid for the extra hardware. Third, the system's security has been compromised in the past and so has been criticized as not being as secure as advertised.

Existing procedures using biometrics have several weaknesses. First, given the distributed nature and sheer number of users, it is usually infeasible to verify identity to a high degree of satisfaction before enrolling in the biometric database. The usual path is to use passwords as a proxy to determine identity before enrolling, and of course if the password is compromised, the attacker can enroll themselves as the user into the database. Second, users are not keen to perform the enrollment step as there is no immediate benefit. Third, the system has a nonzero 'false reject' rate, meaning that sometimes when it's the actually enrolled user, because biometric matching is a statistical process, the system may incorrectly not classify the user. This can lead to frustration on the part of users.

The linkage of a mobile phone with a particular user in existing methods is also vulnerable to attack. Again, the approach to initially link the user's identity with the phone is done via passwords, and so this has the same flaws outlined above, in that an attacker can substitute their phone for the real user if they know the user's password.

In general, while many technologies are available to authenticate a user once they are enrolled into a system, the process of enrollment is broken.

One approach to electronic security is to detect anomalous behavior within these networks and then raise alerts to information technology (IT) security administrators. The anomalous behavior may or may not be malicious. It then falls to the security administrators to investigate these alerts, and their role is to determine if the alert is in fact a dangerous attack that requires addressing or whether it is a false alarm.

However, in practice, most of these alerts are ignored by IT security administrators. This happens for a several reasons. First, most of these alerts are in fact harmless as many legitimate activities on a network can resemble malicious activities. Thus, administrators become fatigued with chasing down so many false alarms that they fail to investigate some of the alerts. Second, the volume of alerts often requires additional capacity from the IT department when these departments are already overloaded with their regular duties. Third, to resolve an alert, it may be prudent out of an abundance of caution to stop a user's access to the network to verify the issue. However, this interruption may not be well received by the user, and may in fact cause them to be upset when the activity is legitimate but is being misflagged. This is compounded when the user is a high level executive, and as the administrator is not certain whether the alert is legitimate or not, it can cause political difficulties within the organization. Thus, in reality, because of these reasons, these alerts are not followed up on.

There exists a need for a system that can resolve these alerts quickly and accurately with minimal intervention from IT administrators.

The process of verifying a user before they are enrolled into the system is termed "identity proofing." Identity proofing is generally seen as the domain of the staff administering the network, and has been an area that has not received much attention. These staff are usually overloaded, and since there is no automated way to proof an identity, the process is usually manual. Worse, because information technology staff in general have little or no direct knowledge of the user, the user is asked some questions to identify them, such as their employee number. Again, an attacker can steal this information and present themselves as the user, so the process is fraught with risk. In addition, because the identity proofing process requires effort from system administrators, it cannot be easily performed more often after enrollment. Most phishing attacks for example could be stopped quickly if there were a lightweight and quick way to proof identity.

Solution to Problem

The system and method disclosed is directed to a specific implementation of a solution to a problem in identity-proofing used in the electronic security arts. The security steps disclosed are notably faster and more efficient than those used in existing identity-proofing methods. This system and method can significantly improve actual security in identity-proofing using electronic means of commerce and communication.

The solution is a system and method that improves computer functionality in that the steps disclosed enable use of computers with less risk of damage due to compromise by attackers.

The steps disclosed achieve benefits over conventional security measures in that they are uniquely based on identity-proofing using an automated system that promptly obtains a reliable vouching of the user's identity by people familiar with the user's characteristics and identity.

The solution is a system and method that is based on saving identity-proofed biometrics of the user after automated and high-confidence vouching steps have taken place, so that these identity-proofed biometrics can be used with high assurance of the validity of authentication of the user.

The solution is a system and method that enables action on feedback information to be conveyed automatically back to the computer system to resolve security alerts automatically without any further intervention from the administrator.

The solution is a system and method that enables improved reliability of user authentication at sign in and when a user attempts to reset a password.

The solution is a system and method that provides full reviewability and auditability to administrators.

Advantageous Effects of Invention

The steps disclosed herein improves the functioning of electronic technology by helping to eliminate identity-proofing errors associated with access to computer systems and electronic commerce.

The method addresses known problems in obtaining reliable assurance that the user is who the user claims to be. The disclosed steps can not only automate the user-authentication processes in terms of the functioning of technology, but will avoid most issues involving user-identity fraud and administrator error in identity proofing.

The method increases functional efficiency in computer systems and electronic commerce because it discloses an automated identity-proofing process that minimizes decisions by persons who are not personally familiar with how the potential candidate looks and speaks from deciding on user authentication. Human involvement is predicated on knowledgeable verification of the user's identity by people familiar with the user's characteristics and identity.

The method provides an assurance of the validity of authentication of the user.

The method enables administrator action on feedback information to be conveyed automatically back to the computer system to resolve security alerts automatically without any further intervention from the administrator.

The method provides full reviewability and auditability to administrators.

The method disclosed herein enables use of a mobile-device application (an "app") to automate the collection of a video from the user or a photo or a fingerprint image, depending on what biometrics have been enabled and stored for that user in an identity-proofing phase.

The app would implement the steps by comparing the collected data (video and/or photo and/or fingerprint image) to the data from the identity-proofing phase. The system also compares data from the mobile device to ensure it's the same mobile device that was used either during the identity-proofing phase or afterwards. If all elements match, then this user is deemed as approved. If not, this user is deemed indeterminate and other actions are taken.

If deemed approved, then optionally additional information is collected from the user and the required approval is conveyed back to the server.

If indeterminate, an alarm is raised to the administrator. The collected video and audio is available to them on the management website, and they may then use it to determine if indeed it was an attacker or whether the system made an error. If necessary, the administrator may then pass on the collected video to one or more people in the attest list for that user for further confirmation.

BRIEF DESCRIPTION OF DRAWINGS

The drawings illustrate preferred embodiments of the process involving identity proofing according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

FIG. 1 is a block diagram showing the steps in a preferred embodiment of the method of the invention, the method involving acting on a video received from a potential candidate for identity proofing.

FIG. 2 is a block diagram showing optional additional steps to the steps of FIG. 1, the added steps involving a confidence level.

FIG. 3 is a block diagram showing optional additional steps to the steps of FIG. 1, the added steps involving a list of associates relative to affirming or disavowing an identity.

FIG. 4 is a block diagram showing optional additional steps to the steps of FIG. 1, the added steps involving an audio biometric.

FIG. 5 is a block diagram showing optional additional steps to the steps of FIG. 1, the added steps involving storing a characteristic.

FIG. 6 is a block diagram showing optional additional steps to the steps of FIG. 1, the added steps involving subsequent requests for identity proofing.

FIG. 8 is a block diagram showing the steps in a first alternative embodiment of the method of the invention, the first alternative embodiment involves acting on a video and also deriving a biometric on data acquired from the potential candidate.

FIG. 9 is a block diagram showing the steps in a second alternative embodiment of the method of the invention, the second alternative embodiment involves acting on a video and also specifying an action to be performed upon receiving an affirmation of identity.

DESCRIPTION OF EMBODIMENTS

Figure 7:
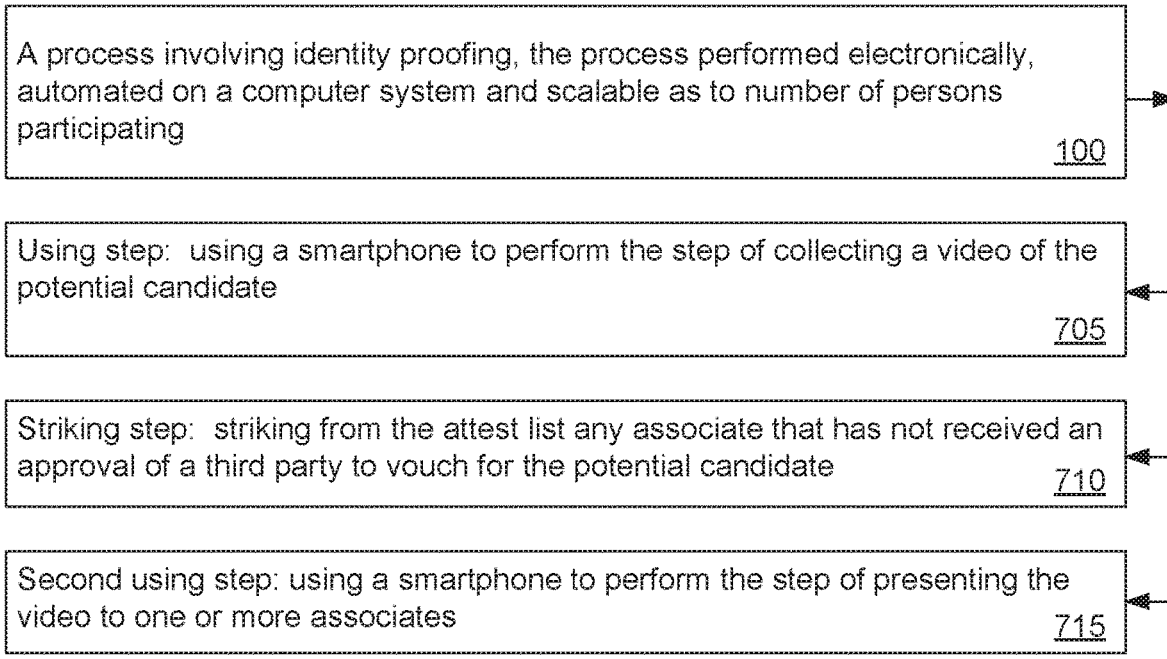
FIG. 7 is a block diagram showing optional additional steps to the steps of FIG. 1, the added steps involving use of a smartphone.

In the following description, reference is made to the accompanying drawings, which form a part hereof and which illustrate several embodiments of the present invention. The drawings and the preferred embodiments of the invention are presented with the understanding that the present invention is susceptible of embodiments using a different order of steps, or using other steps in addition to those specified. As long as the requirements of the steps are complied with, the order of the steps may be changed without departing from the scope of the invention.

FIG. 1 illustrates the preferred steps in the method of the invention, which is a process (100) involving identity proofing. The process (100) is preferably performed electronically by access to a computer database having thereon necessary lists to enable the steps in the process (100) to be automated using a computer system and or network. Communications to associates of a person seeking identity proofing are also preferably made electronically, such as by email or by using web links. Such computer use enables the process (100) to be fast, efficient and virtually unlimited as to the number of people involved in the process of identity proofing. The person seeking identity proofing is interchangeably referred to herein as a "potential candidate" or a "user."

The process (100) that may be described as first preferred method includes seven steps: These are a Verifying step (105), a Creating step (110), Collecting step (115), a Presenting step (120), an Asking step (125), a Deriving step (130), and a Saving step (135).

The Verifying step (105) is verifying that a potential candidate electronically seeking identity proofing is on an electronic directory of persons eligible for such identity proofing. The electronic directory is preferably a database of persons, such as, MICROSOFT'S ACTIVE DIRECTORY, a telephone directory, or other list of persons within an organization. The database would also preferably show a person's position within an organization and may have information on colleagues and superiors within the organization. The electronic directory may be developed using a social graph in a social network or from the set of people who a potential candidate regularly communicates with using electronic means (covering both messaging and email).

The Creating step (110) is creating an attest list, the attest list comprising for each potential candidate, one or more associates of the potential candidate that can confirm the identity of the potential candidate when viewing a video of the potential candidate. The attest list is optionally a cross-reference in the electronic directory that the person so referenced is qualified to attest for a specific potential candidate in the electronic directory.

The Collecting step (115) is collecting a video from the potential candidate making an electronic request for identity proofing. The video is a digital recording of moving visual images of the potential candidate. The video preferably includes an audio component representing a digital recording of the something said by the potential candidate and made with the video. Thus, the video may or may not include an audio component.

The Presenting step (120) is presenting the video to the one or more associates on the attest list. This is optionally accomplished by an email to the person, i.e. an attesting person, who has been previously qualified to attest to the identity of the potential candidate. The email preferably has the digital video file attached to the email or provides a link for the attesting person to click on to review the video.

The Asking step (125) is asking the one or more associates for a confirmation or a disavowal of the identity of the potential candidate based on reviewing the video. This is optionally accomplished by an email to the attesting person to review the video file and send a reply that either confirms the identity of the person on the video file or indicates that the person in the video is not who he claims to be.

The Deriving step (130) is deriving a biometric from the video upon receiving the confirmation from any of the one or more associates. Preferably, the biometric is derived when enough of the associates approve. A biometric is derived by statistical analysis of measurable biological characteristics obtained from the video in this case, or any other biological data in other cases, that are unique to the individual. This step may be performed at any time in the process (100) after receiving the video from the potential candidate. For example, a temporary biometric might be created immediately upon receipt of the video and held for later action in the process (100).

There are various types of characteristics that can be derived from a video, including, as examples: retina scans produce an image of the blood vessel pattern in the light-sensitive surface lining the individual's inner eye; iris recognition is used to identify individuals based on unique patterns within the ring-shaped region surrounding the pupil of the eye; Finger scanning, the digital version of the ink-and-paper fingerprinting process, works with details in the pattern of raised areas and branches in a human finger image, finger vein identification is based on the unique vascular pattern in an individual's finger; facial recognition systems work with numeric codes called face prints, which identify 80 nodal points on a human face, and when audio is also present, voice identification systems rely on characteristics created by the shape of the speaker's mouth and throat, rather than more variable conditions.

The Saving step (135) is saving the biometric as an identity-proofed biometric. Once the potential candidate's identity has been confirmed or verified by those designated to review and confirm the potential candidate's identity, and after the biometric has been derived (which may occur at any time after receipt of the video), then the biometric is saved and designated as an identity-proofed biometric. The identity-proofed biometric may be saved to a system computer, to a smart phone, or to any other computer accessible in implementing the process. The identity-proofed biometric is then electronically available to be used for future comparisons against later videos sent seeking confirmation of the identity of that potential candidate in a future authentication request. If there were a disavowal of identity from an associate, then this preferably means that the potential candidate's identity proofing failed. In the event of such a failure, there would be no identity-proofed biometric.

Example of a Preferred Embodiment

In this example, the system includes of a frontend client (a local computer, such as a smartphone or a tablet computer, also referred to as a mobile device) and a backend server (a remote computer, such as a network computer). The mobile device collects via an app on the mobile device a short video of the potential candidate wanting access to the computer network of an organization to which the potential candidate works for or otherwise belongs. The app is designed to collect audio, video and photo data from the potential candidate for verification of the potential candidate's identity. In this example, the mobile device accesses an electronic directory of people, such as MICROSOFT'S ACTIVE DIRECTORY, within that organization over an LDAP protocol to verify that the potential candidate owning the mobile phone is eligible for identity proofing. It can access the potential candidate's information within the directory by first asking the potential candidate for an identifying piece of information such as their email address or name, and then using that information to query the electronic directory.

In this example, the system then identifies one or more colleagues or associates of the potential candidate who are listed as being able to vouch for the identity of potential candidate. For this example, this consists of people with direct knowledge of the potential candidate and have been approved by someone else in the organization to be able to vouch for the potential candidate. Examples of such colleagues are supervisors, peers, subordinates, etc.

In this example, the app on the potential candidates mobile device then contacts one or more colleagues via the app on their mobile phone and presents the potential candidate's video. The app on the colleague's or colleagues' mobile phone(s) then asks for their confirmation or disavowal of the potential candidate's identity.

In this example, each colleague then either approves the potential candidate or rejects the request for identity proof. Approval occurs if there are enough positive responses and no negative responses. If there are any disavowals, the app rejects the request for identity proof and alarms are sent to the administrators of the system. The administrator can then review the video and take appropriate action.

In this example, once the potential candidate is approved as to his identity, the approved status is conveyed back to the potential candidate via the app and the acquired video is processed to derive biometrics, such as facial and voice biometrics. In addition, if the mobile device has the capability to take a fingerprint, then fingerprint biometrics are also derived and stored on the mobile device. Because these biometrics are trusted only after identity-proofing, they are termed as identity-proofed biometrics. Note that the biometrics can alternately be stored on the backend server.

In this example, the backend server is designed to receive subsequent requests to authenticate the identity of the potential candidate received from people other than the potential candidate or from computer systems. Once a request is received at the backend server, the backend server contacts the mobile device for the potential candidate and asks the potential candidate to input new audio, video fingerprint or photo data. Once the input is processed to derive a new biometric, which is saved with the app or on the backend server, the new biometric is compared to the identity-proofed biometric. If the comparison is favorable, then, a response is conveyed, using the app on the potential candidate's mobile device or using the backend server, to the requesting party.

In this example, the backend server operates as a reporting interface that provides a mechanism for administrators to securely log in and review the performance of the system. In this example, the reporting interface is accessible over the web. Administrators are able to look at each authentication the backend server performed and review the audio, video or photo data as well as the system decision to authenticate or disavow the identity of the potential candidate. Administrators are also given control abilities to change the system's decision or for affecting the entire system as a whole.

In this example, the backend server is deployed on a cloud platform such as Amazon AWS. For other examples, it may reside in multiple different computer systems, but may reside on one system or some combination thereof. The appropriate configuration depends on the application and security scenario the system is tasked with.

Optional Steps and Alternatives

The Designating step (205) is an optional step indicated by the dashed line in FIG. 2 that links the boxes to the process (100) box. The same practice using dashed lines is followed in later figures. The Designating step (205) is designating a number of associates of the potential candidate that are needed to confirm the identity of the potential candidate. For example, if a person superior to the potential candidate in an organizational ranking viewed the need to obtain a higher level of assurance that potential candidate is in fact who he claims to be, then that person can designate that this potential candidate be vouched for by more than one associate on the attest list. This step provides an optional level of added security for those with access to organizational secrets or are important to the success of the organization.

The Scoring step (210) is an optional step that involves scoring a confidence level in the confirmation of identity, wherein the confidence level is the percentage of associates meeting the designation. For example, if 4 out of 5 associates confirmed the identity, but one was missing, then a confidence level of 80% could be scored. Preferably, the confidence level is an internal metric that is used for management of the identity proofing process.

The Second saving step (215) follows the Scoring step (210) and is saving the confidence level with the identity-proofed biometric. Identity proofing as carried out in the steps with the 100 series reference numbers is what may be considered an initialization phase or a phase 1. Subsequent to the initiation phase, the potential candidate is asking for confirmation that they match the proofed identity. This process is generally termed authentication and may be considered phase 2. So, in this sense, the potential candidate in the initialization phase is a potential candidate for receiving an identity-proofed biometric. Later, after an identity-proofed biometric has been saved, when the potential candidate seeks confirmation of his or her identity, authentication of that identity occurs based on a comparison of a biometric derived from a second video with the identity-proofed biometric.

The Second creating step (305) is an optional step that involves creating a list of the one or more associates who confirmed or disavowed the potential candidate. This is both a record keeping of vouches and disavowals of identity and can be used to assess the reliability of the system should that be warranted by later events.

The Associating step (310) follows the Second creating step (305) and is associating the list with the identity-proofed biometric. Associating the list with the identity-proofed biometric maintains a link to the potential candidate's record. For example, for the list to be most useful, when needed to assess the reliability of the process (100) for the potential candidate, it should be readily available to a reviewer of the actions taken on the potential candidate in the process of identity proofing.

The Third saving step (315) is saving the list. Preferably, the list is saved so as to be readily accessible and so it is preferably saved with the identity-proofed biometric.

The Second collecting step (405) is an optional step that involves collecting an audio component within the video. Preferably, but not necessarily, the video includes an audio component comprised of the potential candidate's voice. The potential candidate may be asked to speak so that an audio file can be collected. Examples of such speech include: their name, their title, their organization's name or a passphrase. The audio file may be then heard by the person vouching for the identity of the potential candidate.

The Second deriving step (410) follows the Second collecting step (405) and is deriving an audio-biometric from the audio component. The audio once converted to a biometric, termed an audio-biometric simply to linguistically distinguish it from the biometrics derived from the video, can be saved and later used to compare with a new voice component in a subsequent authentication request of the identity of the potential candidate. The comparison would typically comprise looking for comparable words, sounds and pitch patterns, matching pitch, formants, comparing the way the words flow together, and noting the pauses between words. Preferably, both aural and spectrographic analyses would be employed. Typically, the audio component would be collected with the video on the potential candidate's smart phone.

The Fourth saving step (415) is saving the audio-biometric with the identity-proofed biometric. Preferably, the biometric from the video and the audio-biometric would be saved together so as to constitute an identity-proofed biometric.

The Storing step (505) is an optional step involving storing a first characteristic with the identity-proofed biometric, the first characteristic comprising at least one of: a location where the electronic request originated; a type of computer from which the electronic request originated; a Media Access Control (MAC) address from which the electronic request originated; and an Internet Protocol address from which the electronic request originated. Matching any one of these characteristics with those obtained in a subsequent authentication request by the potential candidate is a means to add to the confidence in identity verification.

The Receiving step (605) is an optional step involving authentication after the identity-proofed biometric has been saved. As discussed above, The Receiving step (605) may be considered a first step in phase 2, involving authentication.

The Receiving step (605) is receiving a second video from the potential candidate incident to a subsequent electronic request for authentication from the potential candidate. The second video may or may not include an audio component.

The Third deriving step (610) follows the Receiving step (605) and is deriving a second biometric from the second video.

The Setting step (615) is setting a threshold for matching the second biometric with the identity-proofed biometric. The comparison with the identity-proofed biometric may not be a 100% match as there are factors that may affect the biometric, such as a change in facial appearance or voice print due to illness. The threshold is a tool to gauge the confidence level in the subsequent electronic request for authentication.

The Denying step (620) is denying authentication of the potential candidate if the second biometric does not meet the threshold. The Denying step (620) is intended to emphasize the adverse consequence of not meeting the threshold leading to a denial of the authentication request. It is also noted that lower than threshold levels may also result in a further request for information from the potential candidate.

The Taking-action step (625) is taking an action when matching the second biometric with the identity-proofed biometric meets or exceeds the threshold. The Taking-action step (625) is an optional step in the sense that it is not a thorough listing of the possible actions to be taken, but rather lists the most common steps to be taken once the threshold is met or exceeded.

Among the actions listed to be taken in The Taking-action step (625) is one selected from the group consisting of: limiting access to the computer system by the potential candidate, allowing access to the computer system by the potential candidate, collecting and changing a password associated with the potential candidate, verifying authorship of an electronic document, verifying the authorization of an email from the potential candidate, signing an electronic document by the potential candidate, and issuing a physical identification document that vouches for the identity of the potential candidate.

The Using step (705) is an optional step that includes using a smartphone to perform the step of collecting a video of the potential candidate. A smartphone is a preferred option because of its versatility to easily and conveniently convey audio, video, fingerprint, location, and other characteristics.

The Striking step (710) is an optional step that includes striking from the attest list any associate that has not received an approval of a third party to vouch for the potential candidate. As an example, the Striking step (710) enables a supervisor to revoke the right of any associate of the potential candidate to confirm the identity of the potential candidate. During the course of operation of the system, it may become necessary to remove an entry in a chain of trust that links entries for multiple people. Each entry includes an identifying indicator for that person, a biometric for that person, and an attest list including third parties that can vouch for the potential candidate. This process of removal is termed 'revocation'. Revoking may become necessary when an employee leaves an organization for example—this is a benign revocation. A more serious case is when the data within the chain of trust is compromised with an impostor's data —this is a malign revocation. The revocation process is as follows: The entry within the chain of trust of the person who is being revoked is located using the identifying indicator. If the revocation is benign, all other entries where this person is on the attest list are located and the attest list of these entries is updated by removing this person from the attest list. If the revocation is malign, all other entries where this person is on the attest list are located, and a list is formulated of all entries where the person being revoked has vouched for someone. All those entries are marked untrusted. Next, looking at this set of newly untrusted persons, any persons they vouched for is marked untrusted, and anyone these people vouched for is marked untrusted, and so on, and this process is repeated down the chain of trust. Optionally, alerts may be generated for these entries to re-verify. The attest list of all entries that contain this person being revoked are updated by removing this person. Finally, this entry is deleted from the chain of trust.

The Second using step (715) is an optional step that includes using a smartphone to perform the step of presenting the video to one or more associates. The Second using step (715) makes notice of the potential to expand the means for contacting the associate on the attest list even if the associate is not "in the office," for example, at a computer terminal on his desk. This improves the timeliness of the vouching steps in the process (100).

The Deriving from data step (830) is in a second preferred embodiment of the process (100) that comprises some of the same steps including the Verifying step (105), the Creating step (110), the Collecting step (115), the Presenting step (120), and the Asking step (125), as described above for the first preferred method.

The Deriving from data step (830) is a new step that includes deriving a biometric from data acquired from the potential candidate. The term "data" is broader than a video and is intended to capture characteristics of the potential candidate that may be used instead of the video for deriving the biometric. In the Deriving from data step (830), the biometric is derived instead from the data and not from the video.

The Deriving from data step (830) may be performed at any time after receipt of the data, but would typically be performed upon receiving the confirmation from each of the one or more associates. The data preferably include transmissions other than a video, such as for example, a fingerprint, an eye scan, or other biological characteristic of the potential candidate. This optional step is used in addition to the Verifying step (105), the Creating step (110), the Collecting step (115), the Presenting step (120), and the Asking step (125) involving an associate reviewing a video from the potential candidate and sending authenticating or disavowing the claimed identity of the potential candidate.

The Fifth saving step (835) follows the Deriving from data step (830) and includes saving the biometric derived from the data as an identity-proofed biometric. This step specifies that the identity-proofed biometric is derived from the data obtained from the potential candidate.

The Second taking-action step (905) is in a third preferred embodiment of the process (100) that comprises some of the same steps including the Verifying step (105), the Creating step (110), the Collecting step (115), the Presenting step (120), and the Asking step (125), as described above for the first preferred method.

The Second taking-action step (905) is a new step when implementing the steps in the third preferred embodiment of the process (100). The Second taking-action step (905) includes taking an action upon receiving the confirmation, said action selected from the group consisting of: limiting access to the computer system by the potential candidate, allowing access to the computer system by the potential candidate, collecting and changing a password associated with the potential candidate, verifying authorship of an electronic document, verifying the authorization of an email from the potential candidate, signing an electronic document by the potential candidate, and issuing a physical identification document that vouches for the identity of the potential candidate.

The above-described embodiments including the drawings diagrammatically display examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the electronic security industry.

What is claimed is:

1. A process for identity proofing a user in an organization, the process comprising:
   acquiring data from a mobile device associated with the user, the data used for verifying an identity of the user;
   creating an attest list for the user, the attest list comprising one or more associates of the user that can confirm the identity of the user when viewing a video of the user, wherein creating the attest list comprises identifying persons to verify the identity of the user from a directory of the organization who have been approved to confirm the identity of the user by another person within the organization;
   presenting the video of the user to the one or more associates on the attest list for confirmation of the identity of the user;
   obtaining confirmation of the identity of the user from the one or more associates based on reviewing the video of the user;
   generating an identifying indicator for the user based on the confirmation of the identity of the user from the one or more associates;
   storing the identifying indicator for the user with the attest list comprising the one or more associates that confirmed the identity of the user and
   marking the identifying indicator as untrusted when an associate on the attest list that confirmed the identity of the user is marked as untrusted.

2. The process of claim 1, further comprising marking as untrusted any identifying indicator for other persons whose identities were confirmed by the user.

3. The process of claim 1, further comprising:
   storing the video with the identifying indicator for the user; and
   providing an administrator with capability to review the video and with a capability to change the confirmation of the identity of the user.

4. The process of claim 1, further comprising:
   generating a biometric for the user;
   storing the biometric for the user with the identifying indicator for the user;
   wherein the biometric is compared to later presented data to authenticate the identity of the user.

5. The process of claim 4, wherein the biometric for the user is derived from the video.

6. The process of claim 4, further comprising:
   receiving a request for identity authentication of the user with the later presented data after the identifying indicator is saved;
   comparing the biometric for the user to the later presented data; and
   confirming the identity of the user based on the comparison of the identity proofed indicator to the later presented data and the biometric for the user.

7. The process of claim 6, wherein receiving the request for identity authentication of the user is for identity authentication for one or more of logging in to a computer system by the user, verifying that the user is an originator of an email, acquiring an electronic signature of the user for documents, or approving a security alert related to the user.

8. The process of claim 1, wherein identity proofing the user is in response to an electronic request from the user, the process further comprising storing with the identifying indicator at least one of: a location where the electronic request originated; a type of computer from which the electronic request originated; a Media Access Control (MAC) address from which the electronic request originated; and an Internet Protocol address from which the electronic request originated.

9. The process of claim 1, further comprising:
   designating a number of associates of the user that are needed to confirm the identity of the user;
   scoring a confidence level in the confirmation of the identity, wherein the confidence level comprises a percentage of associates confirming the identity of the user; and
   saving the confidence level with the identifying indicator.

10. The process of claim 1, further comprising:
    collecting an audio component within the video;
    deriving an audio-biometric from the audio component; and
    saving the audio-biometric with the identifying indicator.

11. The process of claim 1, wherein the mobile device is a smartphone associated with the user.

12. A process for identity proofing a user in an organization, the process comprising:
    acquiring data from a mobile device associated with the user, the data used for verifying an identity of the user;
    creating an attest list for the user, the attest list comprising one or more associates of the user that can confirm the identity of the user when viewing a video of the user, wherein creating the attest list comprises identifying persons to verify the identity of the user from a directory of the organization who have been approved to confirm the identity of the user by another person within the organization;
presenting the video of the user to the one or more associates on the attest list for confirmation of the identity of the user;
obtaining confirmation of the identity of the user from the one or more associates based on reviewing the video of the user;
generating an identifying indicator for the user based on the confirmation of the identity of the user from the one or more associates;
storing the video with the identifying indicator for the user
in response to the one or more associates confirming the identity of the user in the video and
providing an administrator with capability to review the video and with a capability to change the confirmation of the identity of the user.

13. The process of claim 12, further comprising:
generating a biometric for the user;
storing the biometric for the user with the identifying indicator for the user;
wherein the biometric is compared to later presented data to authenticate the identity of the user.

14. The process of claim 13, wherein the biometric for the user derived from the video.

15. The process of claim 13, further comprising:
receiving a request for identity authentication of the user with the later presented data after the identifying indicator is saved;
comparing the biometric for the user to the later presented data; and
confirming the identity of the user based on the comparison of the later presented data and the biometric for the user.

16. The process of claim 15, wherein receiving the request for identity authentication of the user is for identity authentication for one or more of logging in to a computer system by the user, verifying that the user is an originator of an email, acquiring an electronic signature of the user for documents, or approving a security alert related to the user.

17. The process of claim 12, wherein identity proofing the user is in response to an electronic request from the user, the process further comprising storing with the identifying indicator at least one of: a location where the electronic request originated; a type of computer from which the electronic request originated; a Media Access Control (MAC) address from which the electronic request originated; and an Internet Protocol address from which the electronic request originated.

18. The process of claim 12, further comprising:
designating a number of associates of the user that are needed to confirm the identity of the user;
scoring a confidence level in the confirmation of the identity, wherein the confidence level comprises a percentage of associates confirming the identity of the user; and
saving the confidence level with the identifying indicator.

19. A process for identity proofing a user in an organization, the process comprising:
acquiring data from a mobile device associated with the user, the data used for verifying an identity of the user;
creating an attest list for the user, the attest list comprising one or more associates of the user that can confirm the identity of the user when viewing a video of the user, wherein creating the attest list comprises identifying persons who have been approved to confirm the identity of the user by another person within the organization;
presenting the video of the user to the one or more associates on the attest list for confirmation of the identity of the user;
obtaining confirmation of the identity of the user from the one or more associates based on reviewing the video of the user;
generating an identifying indicator for the user based on the confirmation of the identity of the user from the one or more associates;
storing the identifying indicator for the user with the attest list comprising the one or more associates that confirmed the identity of the user;
marking the identifying indicator as untrusted when an approval to confirm the identity of the user is revoked for an associate on the attest list that confirmed the identity of the user
marking the identifying indicator as untrusted when an approval to confirm the identity of the user is revoked for an associate on the attest list that confirmed the identity of the user.

\* \* \* \* \*